United States Patent
Kuo et al.

(10) Patent No.: US 10,281,729 B2
(45) Date of Patent: May 7, 2019

(54) VEHICLE EQUIPPED WITH HEAD-UP DISPLAY SYSTEM CAPABLE OF ADJUSTING IMAGING DISTANCE AND MAINTAINING IMAGE PARAMETERS, AND OPERATION METHOD OF HEAD-UP DISPLAY SYSTEM THEREOF

(71) Applicants: Shanghai XPT Technology Limited, Shanghai (CN); CHAO LONG MOTOR PARTS CORP., Taoyuan (TW)

(72) Inventors: Bou-Chen Kuo, Taipei (TW); Ying-Yun Chen, Tainan (TW)

(73) Assignees: Shanghai XPT Technology Limited, Shanghai (CN); CHAO LONG MOTOR PARTS CORP., Taoyuan (TW)

( * ) Notice: Subject to any disclaimer, the term of this patent is extended or adjusted under 35 U.S.C. 154(b) by 0 days.

(21) Appl. No.: 15/715,143

(22) Filed: Sep. 25, 2017

(65) Prior Publication Data

US 2018/0239152 A1  Aug. 23, 2018

(30) Foreign Application Priority Data

Feb. 20, 2017 (CN) .......................... 2017 1 0090950

(51) Int. Cl.
| | |
|---|---|
| G02B 27/01 | (2006.01) |
| G06F 3/0481 | (2013.01) |
| G06F 3/01 | (2006.01) |
| G06T 11/60 | (2006.01) |
| B60R 1/00 | (2006.01) |

(52) U.S. Cl.
CPC ..... G02B 27/0179 (2013.01); G02B 27/0101 (2013.01); G02B 27/0149 (2013.01);
(Continued)

(58) Field of Classification Search
CPC ........ G02B 2027/0159; G02B 27/0179; G02B 2027/0183; G02B 2027/0185;
(Continued)

(56) References Cited

U.S. PATENT DOCUMENTS

| 8,792,177 B2 | 7/2014 | Nakamura |
|---|---|---|
| 2010/0066812 A1 | 3/2010 | Kajihara |

(Continued)

FOREIGN PATENT DOCUMENTS

| CN | 203920575 | 11/2014 |
|---|---|---|
| CN | 104932104 | 9/2015 |

(Continued)

*Primary Examiner* — Jeffery A Brier
(74) *Attorney, Agent, or Firm* — Winston Hsu

(57) ABSTRACT

A vehicle equipped with a head-up display system is provided. The head-up display system includes an image source, a mechanically adjustable optic element, at least one reflector, and a control unit. The reflector is configured to reflect an image beam emitted from the image source to a transparent screen of the vehicle, wherein a user may perceive a virtual image through the transparent screen. The mechanically adjustable optic element is disposed in a propagation path of the image for adjusting an imaging distance of the virtual image. The control unit is used for controlling image parameters of the virtual image and is capable of adjusting the imaging distance of the virtual image but keeping at least one of the image parameters remaining the same before and after the change of the imaging distance.

23 Claims, 7 Drawing Sheets

(52) U.S. Cl.
CPC ............ *G06F 3/013* (2013.01); *G06F 3/0481*
(2013.01); *G06T 11/60* (2013.01); *B60R 1/00*
(2013.01); *B60R 2300/205* (2013.01); *G02B*
*2027/0159* (2013.01); *G02B 2027/0183*
(2013.01); *G02B 2027/0185* (2013.01)

(58) Field of Classification Search
CPC ............... B60R 2300/205; G06T 3/40; G09G
2340/04; G09G 2340/045
See application file for complete search history.

(56) References Cited

U.S. PATENT DOCUMENTS

| | | | |
|---|---|---|---|
| 2015/0211877 A1* | 7/2015 | Laycock | G02B 3/14 |
| | | | 701/444 |
| 2015/0234458 A1 | 8/2015 | Hsieh | |
| 2016/0147081 A1* | 5/2016 | Kilcher | G02B 27/40 |
| | | | 359/13 |
| 2016/0150201 A1* | 5/2016 | Kilcher | H04N 9/3129 |
| | | | 348/745 |
| 2017/0116785 A1* | 4/2017 | Jarvis | B60K 35/00 |
| 2017/0131550 A1* | 5/2017 | Oh | G06T 3/40 |
| 2017/0357088 A1* | 12/2017 | Matsuzaki | G02B 5/30 |

FOREIGN PATENT DOCUMENTS

| | | | |
|---|---|---|---|
| CN | 104932104 A | * | 9/2015 |
| CN | 204790192 U | * | 11/2015 |
| CN | 104007541 | | 8/2016 |
| JP | H-11119147 A | * | 4/1999 |

\* cited by examiner

VEHICLE EQUIPPED WITH HEAD-UP DISPLAY SYSTEM CAPABLE OF ADJUSTING IMAGING DISTANCE AND MAINTAINING IMAGE PARAMETERS, AND OPERATION METHOD OF HEAD-UP DISPLAY SYSTEM THEREOF

BACKGROUND OF THE INVENTION

1. Field of the Invention

The present invention generally relates to vehicles equipped with a head-up display system and an operation method of a head-up display system of a vehicle, and more particularly, to a vehicle equipped with a head-up display system and an operation method of a head-up display system of a vehicle that are capable of adjusting the appearance of the projected image and the imaging distance of the virtual image according to a driving parameter of the vehicle.

2. Description of the Prior Art

Head-up display (HUD) has been applied in vehicles and is used for displaying the information such as speed, fuel content or navigation information in the visual field of the driver, such that the driver can read the content without removing their gaze from the windshield.

HUDs in practice today generally have a fixed imaging distance, without the ability to adjust the distance of the virtual image that is seen by the driver. This shortcoming may become a burden for the driver when their eyes are focused at a different distance than the said fixed imaging distance, causing the virtual image to be defocused.

HUDs with adjustable imaging planes have been suggested in the past. These methods created another problem for the driver, for when the imaging distance is changed, a noticeable change in size, shape, or proportion of said image is apparent, which may become a distraction for the driver.

Therefore an HUD with adjustable imaging distance capabilities with minimal distraction to the driver is desired.

SUMMARY OF THE INVENTION

It is therefore one of the objectives of the present invention to provide a vehicle equipped with a head-up display system and related operation method of the head-up display system of the vehicle, wherein the head-up display system is capable of adjusting the imaging distance of the virtual image with minimal distraction to the driver.

The present invention provides a vehicle equipped with a head-up display system. The head-up display system includes an image source, at least one reflector, a mechanically adjustable optic element, and a control unit. The image source is used for generating an image and emitting an image beam corresponding to the image. The at least one reflector is configured to reflected the image beam to a transparent screen of the vehicle, wherein a user may perceive a virtual image through the transparent screen. The mechanically adjustable optic element is disposed in a propagation path of the image beam for adjusting an imaging distance of the virtual image. The control unit is used for controlling a plurality of image parameters of the virtual image and is capable of receiving driving parameters from the vehicle. The image parameters comprise at least one of a vertical field of view (FoV) of the user, a horizontal field of view (FoV) of the user, a size of the image generated by the image source, a size of the virtual image, and an imaging distance of the virtual image. At least one of the image parameters is remained the same before and after the imaging distance is changed.

The present invention further provides an operation method of a head-up display system of a vehicle. The operation method includes:

providing a head-up display system, wherein the head-up display system includes a control unit and is capable of displaying a virtual image on a transparent screen;

obtaining, by the control unit, at least one driving parameter relating to a user's eye focus distance;

estimating, by the control unit, the user's eye focus distance based on the driving parameter;

determining, by the control unit, that the user's eye focus distance has changed or not; and in response to a change of the user's eye focus distance, the control unit:
 (i) determining a current imaging distance of the virtual image as a first imaging distance,
 (ii) based on the change of the user's eye focus distance, determining a second imaging distance for the virtual image, and
 (iii) adjusting the imaging distance of the virtual image from the first imaging distance to the second imaging distance by controlling the head-up display system, and simultaneously adjusting one of the image parameters such that at least another one of the image parameters is remained the same when the virtual image is moved from the first imaging distance to the second imaging distance.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be detailed as follows. The preferred embodiments of the present invention are illustrated in the accompanying drawings with numbered elements to elaborate on the contents and effects to be achieved.

Figure 1A:
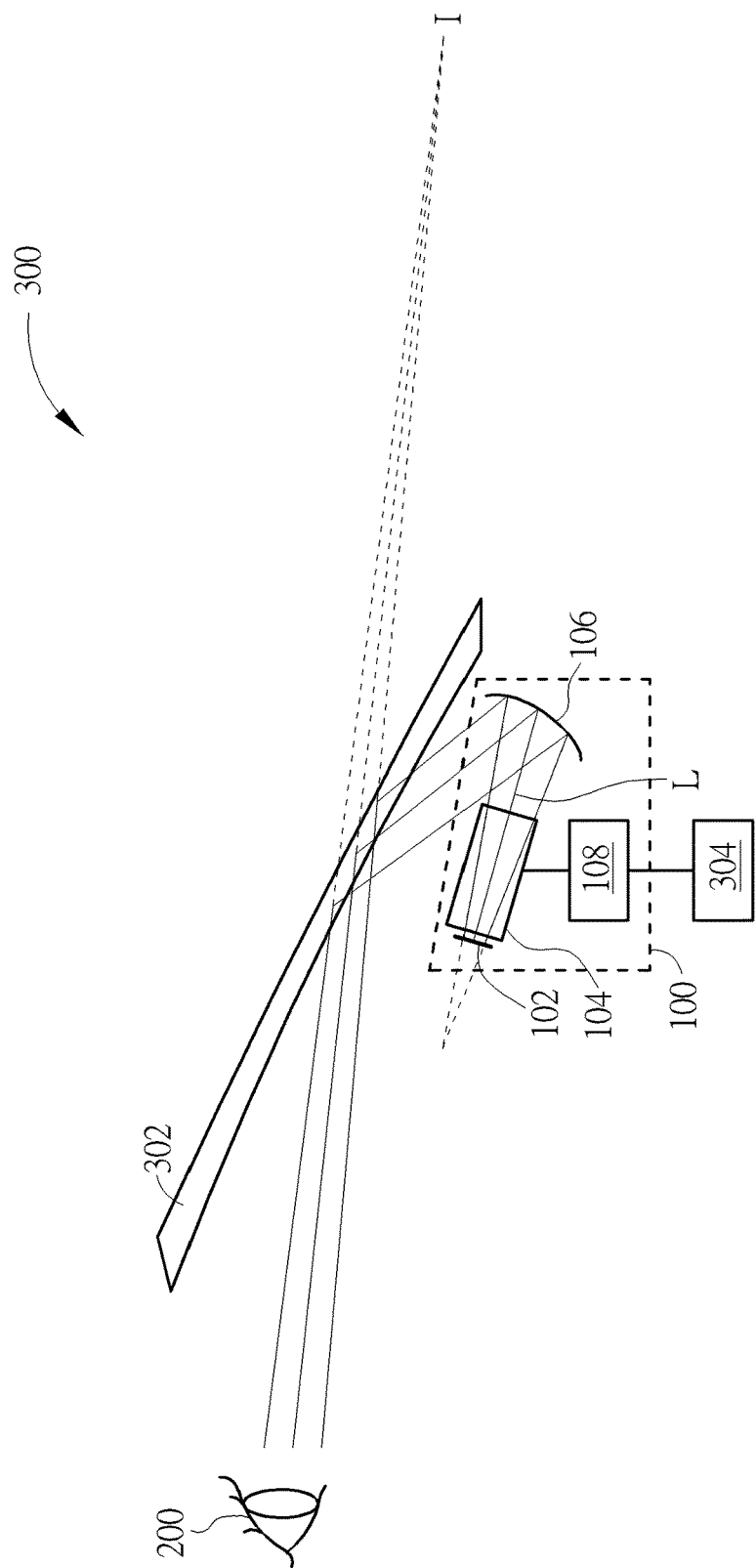
FIG. 1A is a schematic diagram illustrating a head-up display system and a vehicle equipped with the head-up display system according to an embodiment of the present invention.
Figure 2:
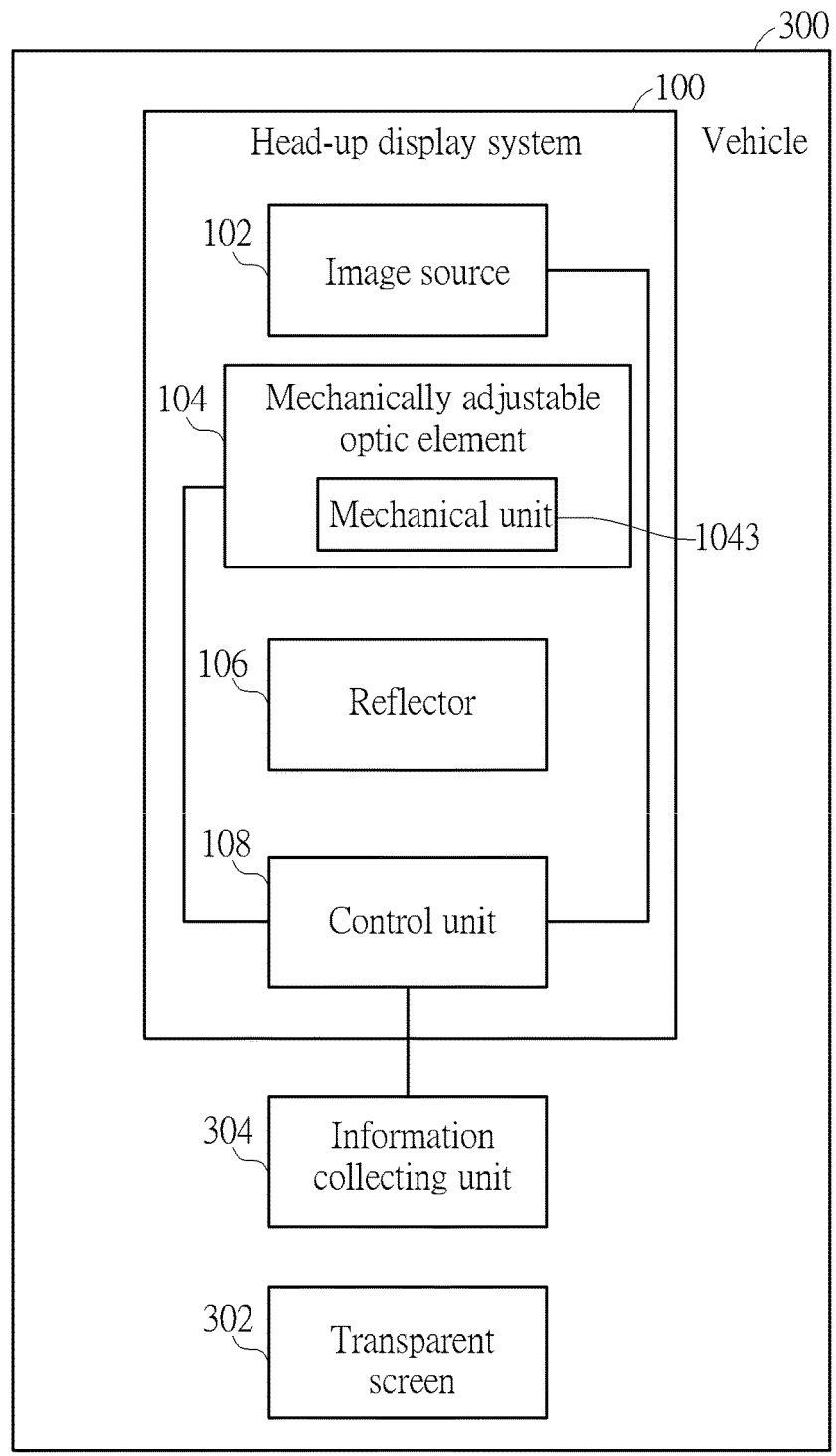
FIG. 2 is a functional block diagram illustrating the head-up display system and the vehicle in FIG. 1A.

Referring to FIG. 1A and FIG. 2, FIG. 1A is a schematic diagram illustrating a head-up display system and a vehicle equipped with the head-up display system according to an embodiment of the present invention, and FIG. 2 is a functional block diagram illustrating the head-up display system and the vehicle shown in FIG. 1A. As shown in FIG. 1A and FIG. 2, the head-up display system 100 of the present invention can be applied to and installed in the vehicle 300, and the head-up display system 100 is located at the front side of a transparent screen 302 of the vehicle 300. In this embodiment, the vehicle 300 may be a car, the transparent screen 302 may be a windshield glass of the car, and the user 200 of the head-up display system 100 may be a car driver for example. However, the present invention is not limited to the above-mentioned application, the head-up display system 100 may be applied to any equipment that is required to display image in front of the user, and the location where the head-up display system 100 is installed is not limited. In this embodiment, the head-up display system 100 is capable of adjusting the appearance of the projected image, such as the pattern proportion, the shape or the size of the projected image, but not limited thereto. According to this embodiment, the head-up display system 100 includes an image source 102, a mechanically adjustable optic element 104, at least one reflector 106 and a control unit 108. The image source 102 is used for generating an image and emitting an image beam L corresponding to the image. For example, the image source 102 may be a liquid crystal projector, a digital light processing (DLP) projector or other devices that can generate or display images, but not limited thereto. The reflector 106 and the image source 102 of the head-up display system 100 shown in FIG. 1A are disposed to face each other, and the reflection surface of the reflector 106 faces the user 200. The reflector 106 is configured to reflect the image beam L to the transparent screen 302 of the vehicle 300, and the user 200 may perceive a virtual image I through the transparent screen 302. In other words, the reflector 106 may be mechanically adjustable to reflect the image beam L to form the virtual image I by reflection with the transparent screen 302. The mechanically adjustable optic element 104 is disposed in a propagation path of the image beam L for adjusting an imaging distance of the virtual image I. Specifically, the mechanically adjustable optic element 104 is disposed between the image source 102 and the reflector 106. Accordingly, before the image beam L arrives the reflector 106, it travels to the mechanically adjustable optic element 104 along a direction away from the user 200, and the location of the virtual image I can be adjusted and even the size (ex. an area) of the virtual image I can be enlarged by the mechanically adjustable optic element 104. For example, when the image beam L passes through the mechanically adjustable optic element 104, the propagation path of the image beam L may be altered by refraction so as to form an enlarged image. Furthermore, after the image beam L passes through the mechanically adjustable optic element 104, the image beam L hits the reflector 106 and is reflected to the transparent screen 302 by the reflector 106. Then, at least a portion of the image beam L is further reflected by the transparent screen 302 to enter the eye box of the user 200, such that the user 200 can perceive a virtual image I of the generated image. As shown in FIG. 1A, the user 200 and the virtual image I perceived by the user 200 are respectively located at different sides of the transparent screen 302. In another aspect, for the user 200, the virtual image I is located at the rear side of the transparent screen 302 or located out of the vehicle 300.

It is noteworthy that the at least one reflector 106 of this embodiment may be a concave mirror, such as an aspherical mirror or a free-form surface mirror, but not limited thereto. Furthermore, the number, type, location and disposing angle of the reflector 106 in the head-up display system 100 are not limited by the content shown in FIG. 1A according to the present invention. For example, the head-up display system 100 may include a reflector module composed of multiple identical or different reflectors. The main purpose and functionality of the reflector 106 or the reflector module is to adjust or alter the propagation path of the image beam L exiting the mechanically adjustable optic element 104, so that the image beam L can be further reflected in a specific angle to an appropriate location on the transparent screen 302. In some embodiments, the image formed by the image beam L can also be partially or entirely magnified or minified while the image beam L travels to the transparent screen 302 through modifying the design of the reflector 106 or the reflector module.

In addition, the control unit 108 of the head-up display system 100 of the present invention is coupled to or is electrically connected to the mechanically adjustable optic element 104. The control unit 108 may be a computer system for example. The control unit 108 is used for controlling a plurality of image parameters of the virtual image I, and the control unit 108 is capable of receiving driving parameters from the vehicle 300, wherein the image parameters include at least one of a vertical field of view (FoV) of the user 200, a horizontal field of view (FoV) of the user 200, a size of the image generated by the image source 102, a size of the virtual image I and the imaging distance of the virtual image I. According to the present invention, at least one of the image parameters is remained the same before and after the imaging distance of the virtual image I is changed. In this embodiment, the control unit 108 can control the mechanically adjustable optic element 104 to adjust the focal length of the mechanically adjustable optic element 104 and to further control the imaging distance of the virtual image I. Moreover, the control unit 108 controls the image source 102 to simultaneously adjust the size (ex. an area) of the generated image according to the imaging distance of the virtual image I, which is defined as the distance from the location of the virtual image I to the transparent screen 302, so that the view angle of viewing the virtual image I for the user 200 (referred to as field of view (FoV) of the user 200 hereinafter) can be remained the same. The operation of the control unit 108 will be described in later paragraphs.

Figure 3:
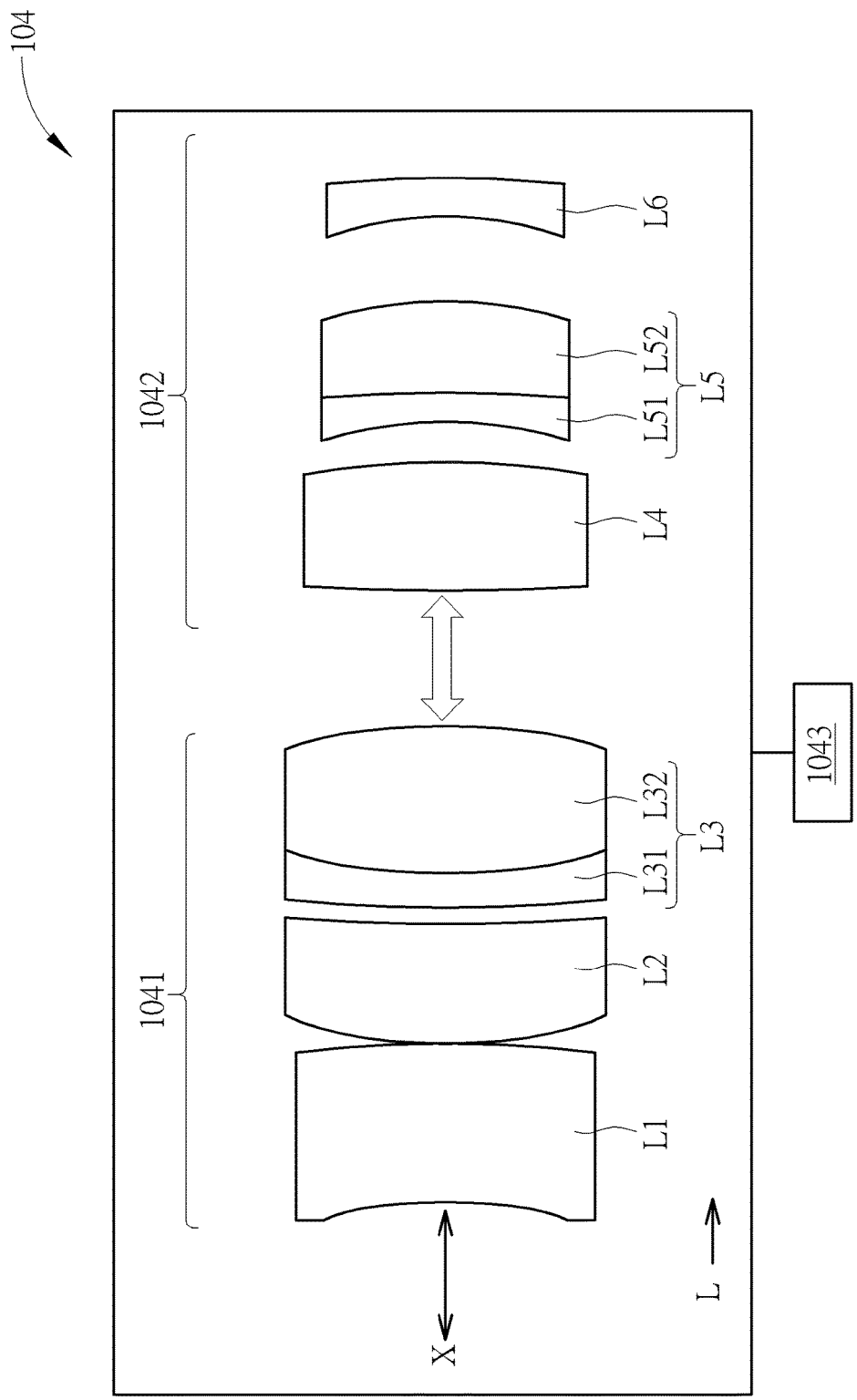
FIG. 3 is a schematic diagram illustrating a mechanically adjustable optic element of the head-up display system in FIG. 1A.

The mechanically adjustable optic element 104 of this embodiment is detailed in the following paragraphs. The mechanically adjustable optic element 104 can be a mechanical focal-length-changeable lens module including a plurality of lenses sequentially disposed between the image source 102 and the reflector 106 along a propagation direction of the image beam L, and at least one of the lenses is capable of moving forward and backward along an optical axis to adjust the imaging distance. For example, referring to FIG. 3, which is a schematic diagram illustrating a mechanically adjustable optic element of the head-up display system in FIG. 1A. The mechanically adjustable optic element 104 of this embodiment is a mechanical focal-length-changeable lens module and includes a first lens module 1041 and a second lens module 1042 sequentially disposed between the image source 102 and the reflector 106 (shown in FIG. 1A) along the propagation direction of the image beam L, which means the second lens module 1042 is disposed between the first lens module 1041 and the reflector 106. The first lens module 1041 includes a lens L1, a lens L2 and a lens L3 sequentially disposed along the propagation direction of the image beam L. The lens L3 is a cemented lens that includes a first sub-lens L31 and a second sub-lens L32, and the first sub-lens L31 is disposed between the lens L2 and the second sub-lens L32. The second lens module 1042 includes a lens L4, a lens L5 and a lens L6 sequentially disposed along the propagation direction of the image beam L. The lens L5 is a cemented lens that includes a third sub-lens L51 and a fourth sub-lens L52, and the third sub-lens L51 is disposed between the lens L4 and the fourth sub-lens L52. The second lens module 1042 is capable of moving forward and backward along an optical axis X (substantially parallel to the propagation direction of the image beam L), as shown as the hollow arrow in FIG. 3, in order to adjust the distance between the first lens module 1041 and the second lens module 1042 and further adjust the focal length of the mechanically adjustable optic element 104. Therefore, the mechanically adjustable optic element 104 of this embodiment can adjust the focal length of the mechanically adjustable optic element 104 by adjusting the distance between lenses of the first lens module 1041 and the second lens module 1042. According to the present invention, the mechanically adjustable optic element 104 may further include a mechanical unit 1043 (shown in FIG. 2) used for driving or moving the second lens module 1042 forward or backward along the optical axis X. For example, the mechanical unit 1043 may include a motor, a rail, a gear and a gear rack, a magnet and a coil, or any combination of the above-mentioned devices, but not limited thereto. The mechanical unit 1043 in the mechanically adjustable optic element 104 may be coupled to or electrically connected to the control unit 108, so as to activate the mechanical unit 1043 to move the second lens module 1042 forward or backward. In other variant embodiments, only the first lens module 1041 or both the first lens module 1041 and the second lens module 1042 are designed to be capable of moving forward and backward along the optical axis X in order to adjust the focal length of the mechanically adjustable optic element 104.

Figure 1B:
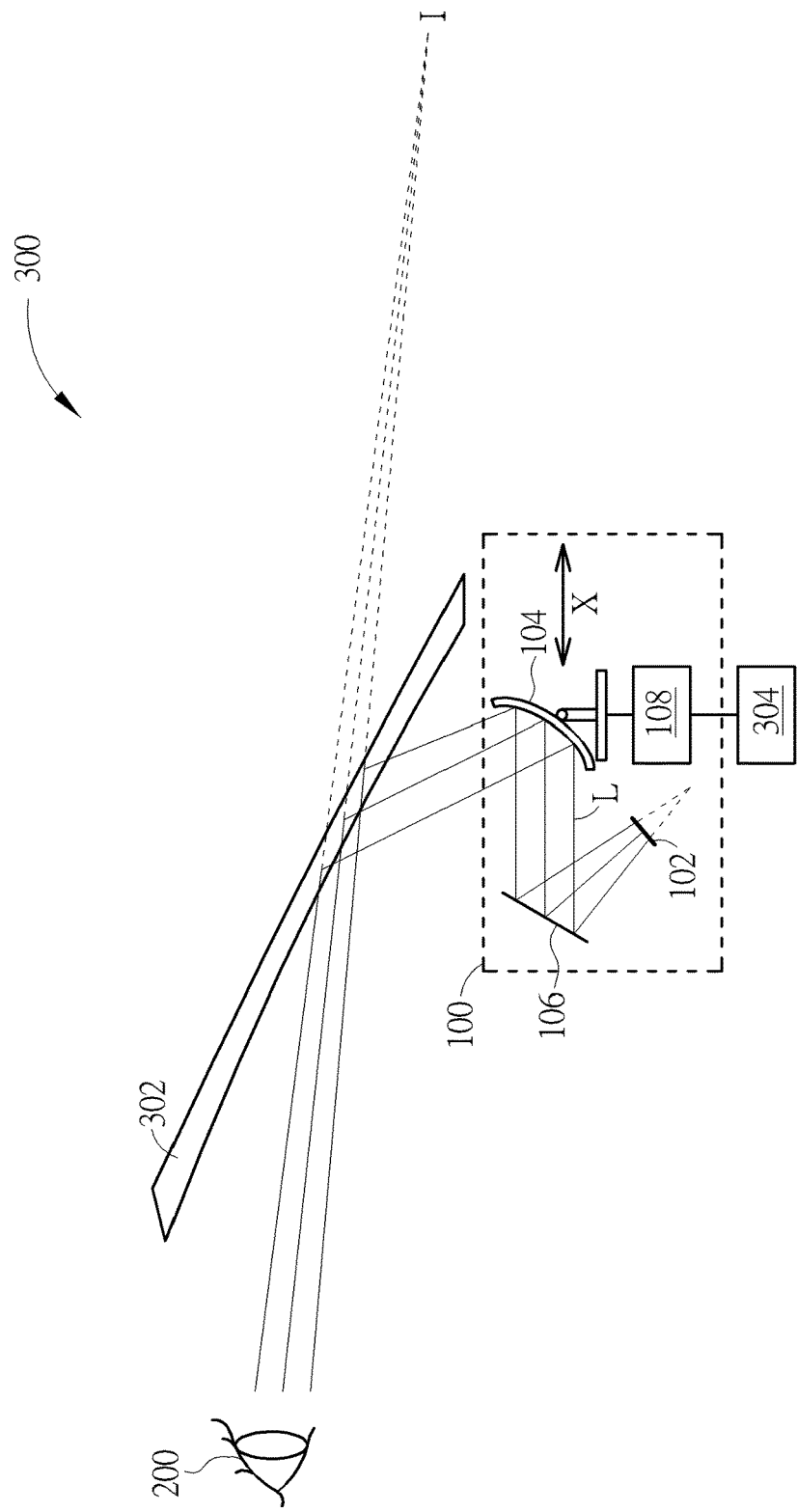
FIG. 1B is a schematic diagram illustrating a head-up display system and a vehicle equipped with the head-up display system according to another embodiment of the present invention.

Referring to FIG. 1B, FIG. 1B is a schematic diagram illustrating a head-up display system and a vehicle equipped with the head-up display system according to another embodiment of the present invention. As shown in FIG. 1B, the mechanically adjustable optic element 104 of this embodiment is a concave mirror module, and the concave mirror module is capable of angle adjustment and moving forward and backward along the optical axis X to adjust the imaging distance. In this embodiment, the reflector 106 may be a plane mirror and is configured to reflect the image beam L emitted from the image source 102 to the mechanically adjustable optic element 104, and the mechanically adjustable optic element 104 reflects the image beam L to the transparent screen 302. The mechanically adjustable optic element 104 includes a concave mirror for example. The location of the virtual image I can be adjusted and even the size (ex. an area) of the virtual image I can be enlarged by adjusting the angle of the mechanically adjustable optic element 104, moving the mechanically adjustable optic element 104 forward and backward along the optical axis X, or adjusting the curvature of the concave mirror. For example, the above adjustments of the mechanically adjustable optic element 104 may be controlled by the control unit 108. In a variant embodiment, the concave mirror module may include a plurality of concave mirrors with identical or different curvatures, wherein the imaging distance can be adjusted by varying the distance between these mirrors. In another variant embodiment, the concave mirror module may include a curvature-changeable concave mirror, wherein the imaging distance can be adjusted by varying the curvature of the curvature-changeable concave mirror.

Figure 4:
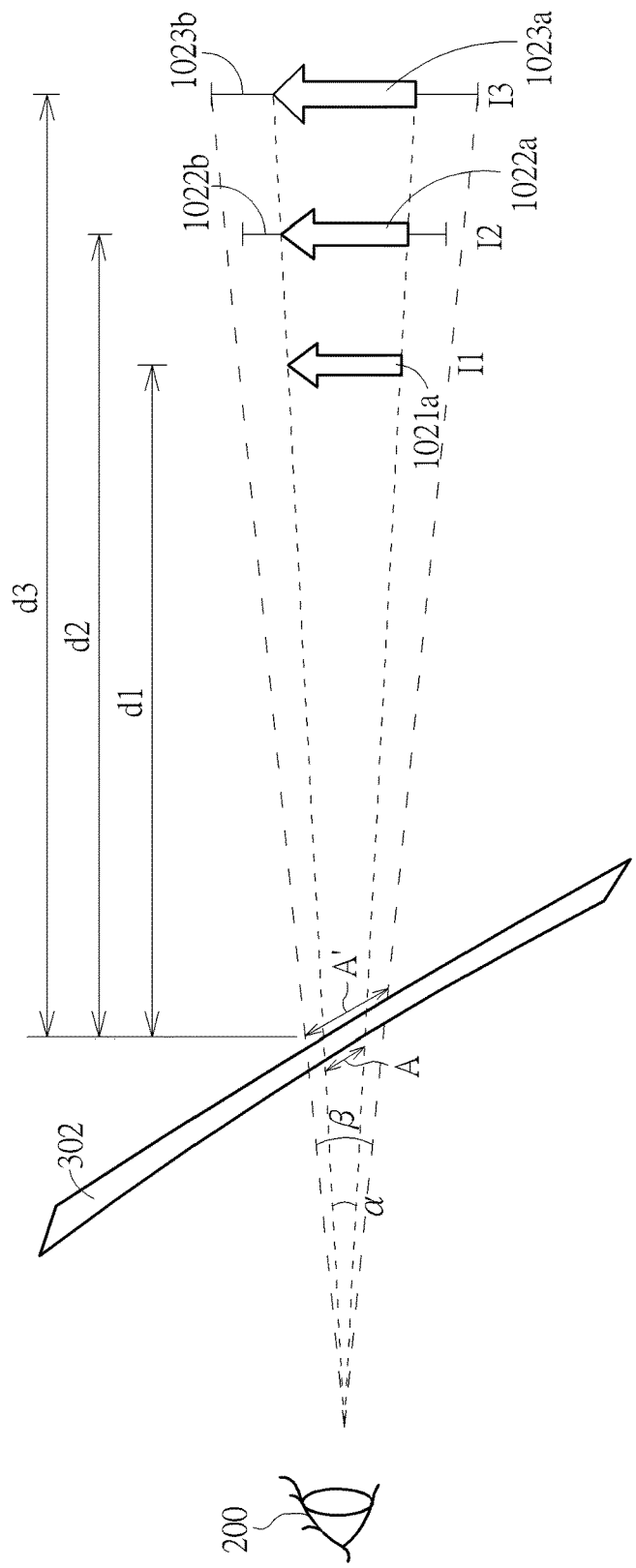
FIG. 4 is a schematic diagram illustrating imaging distances of the head-up display system in FIG. 1A.
Figure 5:
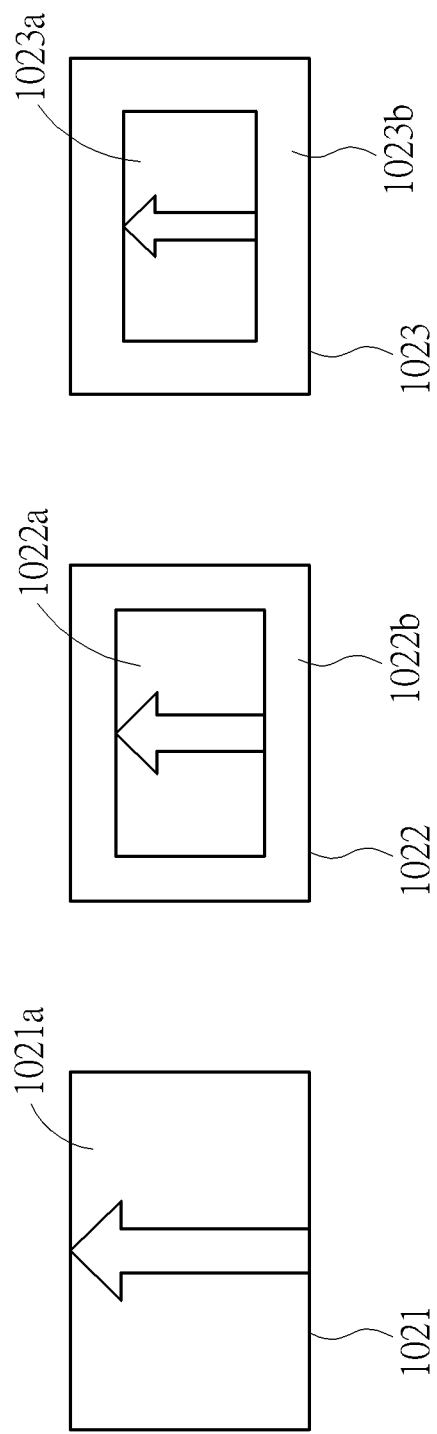
FIG. 5 is a schematic diagram illustrating adjustments of sizes of images generated by the image source of the head-up display system shown in FIG. 1A.

FIG. 4 is a schematic diagram illustrating imaging distances of the head-up display system in FIG. 1A, and FIG. 5 is a schematic diagram illustrating adjustments of sizes of images generated by the image source of the head-up display system shown in FIG. 1A. Referring to FIG. 2, FIG. 4 and FIG. 5, the head-up display system 100 of this embodiment uses the control unit 108 shown in FIG. 2 to control the imaging distance of the virtual image I (shown in FIG. 1A), and the control unit 108 also controls the image source 102 to simultaneously adjust the size of the generated image according to the imaging distance of the virtual image I to the transparent screen 302. For example, the control unit 108 of this embodiment can adjust the focal length of the mechanically adjustable optic element 104 by the aforementioned method, so as to form the virtual image I at three locations respectively represented by the virtual image I1, the virtual image I2 and the virtual image I3. The imaging distances of the virtual image I1, the virtual image I2 and the virtual image I3 are the distance d1, the distance d2 and the distance d3 respectively, wherein d1<d2<d3. It is noteworthy that during the process of adjusting the imaging distance of the virtual image I, the control unit 108 controls and adjusts the size of the image generated by the image source 102 simultaneously as the imaging distance alters. The principle of adjusting the imaging distance and the size of the image by the control unit 108 includes: keeping the image reflected on the transparent screen 302 occupying a constant area A on the transparent screen 302 regardless of the imaging distances of the virtual image I1, the virtual image I2 or the virtual image I3. Therefore, the FoVs of the user 200 for viewing the virtual image I1, the virtual image I2 and the virtual image I3 are all maintained the same, and the image occupies a constant percentage of area in the visual field of the user. Wherein, the aforementioned FoVs of the user 200 may be presented as the view angles α of the user 200 when viewing the virtual image I1, the virtual image I2 and the virtual image I3.

When an imaging distance of the virtual image becomes greater while using converging lenses or concave mirrors, the size of the virtual image becomes larger correspondingly according to the mirror equation and imaging theory of virtual images. In detail, as shown in FIG. 4 and FIG. 5, assuming the size of the image generated by the image source 102 is fixed, when the imaging distance of the virtual image is adjusted from the distance d1 to the distance d3, the size of the virtual image I1 (represented by 1021) is enlarged to the size of the virtual image I3 (represented by 1023), and therefore the view angle α of viewing the virtual image I1 is then increased to the view angle β of viewing the virtual image I3, which means the FoV becomes greater and the virtual image I3 occupies a greater area A' on the transparent screen 302. In this case, the change of the FoV will cause a certain distraction to the user 200. However, according to this embodiment of the present invention as an example, when the control unit 108 controls the virtual image I1 to be imaged at the location closest to the transparent screen 302 (i.e. the distance d1), the size of the image 1021a projected by the image source 102 is the maximum projection image 1021 that can be generated by the image source 102. When the control unit 108 adjusts the imaging distance of the virtual image I2 to be distant from the transparent screen 302 (i.e. the distance d2), the control unit 108 simultaneously adjusts the image source 102 to reduce the size of the generated image. Therefore, the maximum projection image 1022 that can be generated by the image source 102 may include a slightly reduced image 1022a and a peripheral image 1022b, wherein the peripheral image 1022b represents a portion that is not displayed or a portion in which no light beam is projected by the image source 102, but not limited thereto. In the maximum projection image 1022 composed of the image 1022*a* and the peripheral image 1022*b*, the size of the image 1022*a* is reduced compared to the image 1021*a*. In addition, when the control unit 108 adjusts the imaging distance of the virtual image I3 to be the most distant from the transparent screen 302 (i.e. the distance d3), the control unit 108 simultaneously adjusts the image source 102 to further reduce the size of the generated image. For example, the maximum projection image 1023 that can be generated by the image source 102 may include a smaller image 1023*a* and a larger peripheral image 1023*b*, wherein the image 1023*a* has a smaller size compared to the image 1022*a*, and the peripheral image 1023*b* has a larger size compared to the peripheral image 1022*b*. In short, the control unit 108 controls the image source 102 to reduce the size of the generated image simultaneously when the control unit 108 adjusts the imaging distance of the virtual image I to be distant from the transparent screen 302, and the control unit 108 controls the image source 102 to enlarge the size of the generated image simultaneously when the control unit 108 adjusts the imaging distance to be close to the transparent screen 302. Accordingly, one of the aforementioned objectives of the head-up display system 100 of the present invention is achieved. Regardless of the imaging distance of the virtual image I, the FoV or the view angle α of viewing the image for the user 200 remains the same, and the image perceived by the user 200 occupies a constant area on the transparent screen 302, so as to ensure that the area of the image on the transparent screen 302 will not alter as the location of the virtual image I changes, and further to prevent the user's vision from being blocked by the image.

Although the spirit of the design of the present invention is explained by the embodiment of the present invention in which there are three different imaging distances and three different sizes of the generated images, as shown in FIG. 4 and FIG. 5, the head-up display system of the present invention may also linearly adjust the imaging distance and the size of the corresponding generated image. The virtual image is not limited to be formed at only three different locations, and the generated image is not limited to have only three different sizes.

Figure 6:
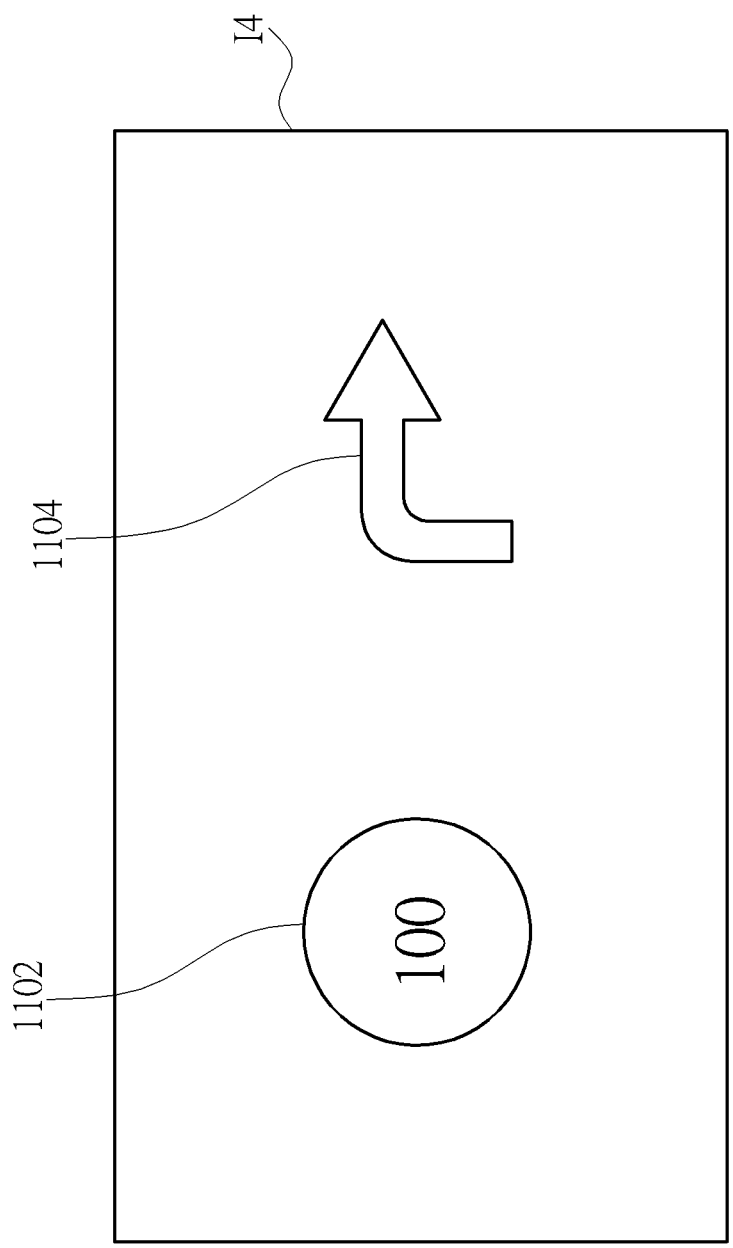
FIG. 6 is a schematic diagram illustrating an image generated by an image source of a head-up display system according to a variant embodiment of the present invention.

Please refer to FIG. 6. FIG. 6 is a schematic diagram illustrating an image generated by an image source of a head-up display system according to a variant embodiment of the present invention. In this variant embodiment, a virtual image I4 may be composed of different figures or features that can present various data or information to the user. For example, the virtual image I4 includes, but not limited to, a FIG. 1102 for displaying the speed and a FIG. 1104 for displaying the advancing direction. According to the present invention, when the imaging distance of the virtual image I4 is changed, not all the sizes of the figures of the virtual image I4 generated by the image source 102 are adjusted. For instance, the FIG. 1104 may be adjusted to be smaller while the FIG. 1102 is unchanged when the imaging distance of the virtual image I4 becomes larger. Also, the control unit 108 may be set to give the instruction to the image source 102 for determining which figure should be remained the same and which figure should be adjusted.

Please refer to FIG. 1A and FIG. 2, the vehicle 300 of this embodiment may further includes an information collecting unit 304 that is electrically connected to the control unit 108 of the head-up display system 100. The information collecting unit 304 can provide an input signal or at least one of the driving parameters of the vehicle 300 to the control unit 108, and the control unit 108 can automatically determine the location of the virtual image I and correspondingly adjust the size of the image generated by the image source 102 according to the input signal or the driving parameter(s) provided by the information collecting unit 304. The input signal or the driving parameter may include at least one of the speed of the vehicle 300, the distance from another vehicle ahead of the vehicle 300, and the distance from an object ahead of the user 200 for instance. As an example, the information collecting unit 304 of this embodiment may include, but not limited to, at least one of a speedometer that can provide the information of the moving speed of the vehicle 300, a camera that can detect the user's eye focus distance or the user's viewing direction, or a radar that can detect the distance from the object ahead, such as another vehicle or signboard. For example, the aforementioned input signal or the driving parameter may include the moving speed of the vehicle 300, such as a car speed. When the vehicle 300 increases speed, the control unit 108 adjusts the imaging distance to be distant from the transparent screen 302, such as the distance d3 shown in FIG. 4. When the vehicle 300 decreases speed, the control unit 108 adjusts the imaging distance to be close to the transparent screen 302, such as the distance d1 shown in FIG. 4. Accordingly, when the eye focus distance of the user 200 becomes further as the speed of the vehicle 300 goes up, the distance of the virtual image I formed by the head-up display system 100 can also be adjusted to become further to match the eye focus distance of the user 200. Therefore, the visual separation of the environment and the generated image induced by the difference between the focal lengths of the generated image and eyes of the user 200 when the vehicle 300 is moving in a high speed is prevented. In addition, the control unit 108 simultaneously adjusts the size of the image generated by the image source 102 when the different imaging distances of the virtual image I are produced according to different speeds, so as to maintain the FoV of the user 200 in constant. In other words, the actual size of the virtual image I perceived by the user 200 is in constant regardless of the moving speed of the vehicle 300, such that the virtual image I with changeable size according to the variable imaging distance will not block the vision of the user 200.

In other embodiments, the control unit 108 controls the mechanically adjustable optic element 104 to adjust the imaging distance to be distant from the transparent screen 302 when the distance from another vehicle ahead of the vehicle 300 or the distance from the object ahead of the user 200 is further, and the control unit 108 controls the mechanically adjustable optic element 104 to adjust the imaging distance to be close to the transparent screen 302 when the distance from another vehicle ahead of the vehicle 300 or the distance from the object ahead of the user 200 is closer. Therefore, the adjusted imaging distance can match the focal length of the user 200 when he viewing the another vehicle ahead of the vehicle 300 or the above-mentioned object ahead of the user 200, so as to decrease the distraction for the user 200.

From the above, the head-up display system of the present invention includes a control unit for controlling a plurality of image parameters, wherein the image parameters include at least one of the vertical field of view (FoV) of the user, the horizontal field of view (FoV) of the user, the size of the image generated by the image source, the size of the virtual image and the imaging distance of the virtual image. The control unit is capable of adjusting the imaging distance by the mechanically adjustable optic element, and at least one of the image parameters is remained the same before and after the imaging distance is changed. In the first embodiment, the FoV of the user remains the same by way of reducing or enlarging the size of the image generated by the image source. In the variant embodiment, the FoV of the user for viewing one FIG. 1102) remains the same but the FoV for viewing another FIG. 1104) is changed.

In addition, according to the present invention, an operation method of a head-up display system of a vehicle is provided. The operation method includes the following steps:

Step 1: Providing a head-up display system of the present invention, wherein the head-up display system is introduced in the previous descriptions, such as in the first embodiment and the variant embodiment.

Step 2: Obtain at least one driving parameter relating to a user's eye focus distance by the control unit. The driving parameter may include at least one of a speed of the vehicle, a distance from another vehicle ahead of the vehicle, and a distance from an object ahead of the vehicle for example, but not limited thereto.

Step 3: Estimate the user's eye focus distance based on the driving parameter by the control unit.

Step 4: Determine that the user's eye focus distance has changed or not by the control unit. For example, when a value of the driving parameter relating to the user's eye focus is not greater than a predetermined threshold value, the control unit determines the user's eye focus distance has not changed.

Step 5: In response to a change of the user's eye focus distance, the control unit, the control unit:
  (i) determines a current imaging distance of the virtual image as a first imaging distance,
  (ii) based on the change of the user's eye focus distance, determines a second imaging distance for the virtual image, and
  (iii) adjusts the imaging distance of the virtual image from the first imaging distance to the second imaging distance by controlling the mechanically adjustable optic element of the head-up display system, and simultaneously adjusts one of the image parameters such that at least another one of the image parameters is remained the same when the virtual image is moved from the first imaging distance to the second imaging distance. For example, the imaging distance of the virtual image, which is one of the image parameters, is adjusted from the first imaging distance to the second imaging distance by the mechanically adjustable optic element according to the instruction of the control unit when the user's eye focus distance is determined changed. And the size of the image generated by the image source is adjusted simultaneously such that another image parameter, the FoV, can remain the same when the imaging distance is changed.

In summary, in the head-up display system and the vehicle carrying this head-up display system of the present invention, the control unit can automatically control the mechanically adjustable optic element according to different speeds (or input signals of other information), so as to let the user perceive the virtual image with different imaging distances in different moving speeds, and further prevent the visual separation of the environment and the generated image induced by the difference between the focal lengths of the generated image and eyes of the user when the vehicle is moving in a high speed. In addition, the control unit simultaneously adjusts the size of the image generated by the image source when the different imaging distances of the virtual image are produced according to different speeds, so as to maintain the image reflected on the transparent screen in a constant area on the transparent screen. Accordingly, the FoV of viewing the virtual image for the user can be constant, and the proportion of the area of the image to the user's vision field is also constant. As a result, the images perceived by the user in different speeds can be harmonized with the real environment, and the user experience and the driving safety can both be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vehicle equipped with a head-up display (HUD) system, the HUD system comprising:
  an image source used for generating an image and emitting an image beam corresponding to the image;
  at least one reflector configured to reflect the image beam to a transparent screen of the vehicle, wherein a user may perceive a virtual image through the transparent screen;
  a mechanically adjustable optic element disposed in a propagation path of the image beam for adjusting an imaging distance of the virtual image; and
  a control unit used for controlling a plurality of image parameters of the virtual image, the control unit being capable of receiving driving parameters from the vehicle, wherein the image parameters comprise at least one of a vertical field of view (FoV) of the user, a horizontal field of view (FoV) of the user, a size of the image generated by the image source, a size of the virtual image and the imaging distance of the virtual image, and at least one of the image parameters is remained the same before and after the imaging distance is changed.

2. The vehicle equipped with the HUD system according to claim 1, wherein the control unit is capable of adjusting the imaging distance by controlling the mechanically adjustable optic element, and additionally controlling the image source to simultaneously adjust the size of the image, so that a FoV of the user remains the same before and after the imaging distance is changed.

3. The vehicle equipped with the HUD system according to claim 1, wherein the control unit is configured for storing data comprising instructions executable to perform the following procedures:
  obtaining at least one driving parameter relating to a user's eye focus distance;
  estimating the user's eye focus distance based on the driving parameter;
  determining that the user's eye focus distance has changed or not; and
  in response to a change of the user's eye focus distance:
    (i) determining a current imaging distance of the virtual image as a first imaging distance,
    (ii) based on the change of the user's eye focus distance, determining a second imaging distance for the virtual image, and
    (iii) adjusting the imaging distance of the virtual image from the first imaging distance to the second imaging distance by the mechanically adjustable optic element, and simultaneously adjusting the image generated by the image source such that at least one of the image parameters is remained the same when the virtual image is moved from the first imaging distance to the second imaging distance.

4. The vehicle equipped with the HUD system according to claim 3, wherein the control unit determines the user's eye focus distance has not changed when a value of the driving parameter relating to the user's eye focus is not greater than a predetermined threshold value.

5. The vehicle equipped with the HUD system according to claim 3, wherein the driving parameter comprises at least one of a speed of the vehicle, a distance from another vehicle ahead of the vehicle, and a distance from an object ahead of the user.

6. The vehicle equipped with the HUD system according to claim 1, wherein the mechanically adjustable optic element is a mechanical focal-length-changeable lens module comprising a plurality of lenses sequentially disposed between the image source and the at least one reflector along a propagation direction of the image beam, and at least one of the plurality of lenses is capable of moving forward and backward along an optical axis to adjust the imaging distance.

7. The vehicle equipped with the HUD system according to claim 1, wherein the mechanically adjustable optic element is a concave mirror module, and the concave mirror module is capable of angle adjustment and moving forward and backward along an optical axis to adjust the imaging distance.

8. The vehicle equipped with the HUD system according to claim 1, wherein the at least one reflector is a free-form surface mirror.

9. The vehicle equipped with the HUD system according to claim 2, wherein a principle of adjusting the imaging distance and the size of the image by the control unit comprises keeping the image reflected on the transparent screen occupying a same area on the transparent screen regardless of the imaging distance.

10. The vehicle equipped with the HUD system according to claim 9, wherein the control unit controls the image source to reduce the size of the image generated by the image source simultaneously when the control unit adjusts the imaging distance to be distant from the transparent screen, and the control unit controls the image source to enlarge the size of the image generated by the image source simultaneously when the control unit adjusts the imaging distance to be close to the transparent screen.

11. The vehicle equipped with the HUD system according to claim 5, wherein the control unit adjusts the imaging distance to be distant from the transparent screen when the speed of the vehicle is high, and the control unit adjusts the imaging distance to be close to the transparent screen when the speed of the vehicle is low.

12. The vehicle equipped with the HUD system according to claim 5, wherein the control unit controls the mechanically adjustable optic element to adjust the imaging distance to be distant from the transparent screen when the distance from another vehicle ahead of the vehicle or the distance from the object ahead of the user is further, and the control unit controls the mechanically adjustable optic element to adjust the imaging distance to be close to the transparent screen when the distance from another vehicle ahead of the vehicle or the distance from the object ahead of the user is closer.

13. The vehicle equipped with the HUD system according to claim 1, further comprising an information collecting unit electrically connected to the control unit, wherein the information collecting unit is capable of providing at least one of the driving parameters to the control unit, and the control unit adjusts the imaging distance automatically according to the driving parameter provided by the information collecting unit.

14. The vehicle equipped with the HUD system according to claim 13, wherein the information collecting unit includes at least one of a speedometer, a camera, and a radar.

15. An operation method of a head-up display (HUD) system of a vehicle, comprising:
providing a HUD system, the HUD system comprises a control unit and is capable of displaying a virtual image on a transparent screen;
obtaining, by the control unit, at least one driving parameter relating to a user's eye focus distance;
estimating, by the control unit, the user's eye focus distance based on the driving parameter;
determining, by the control unit, that the user's eye focus distance has changed or not; and
in response to a change of the user's eye focus distance, the control unit:
(i) determining a current imaging distance of the virtual image as a first imaging distance,
(ii) based on the change of the user's eye focus distance, determining a second imaging distance for the virtual image, and
(iii) adjusting the imaging distance of the virtual image from the first imaging distance to the second imaging distance by controlling the HUD system, and simultaneously adjusting one of the image parameters such that at least another one of the image parameters is remained the same when the virtual image is moved from the first imaging distance to the second imaging distance.

16. The operation method of the HUD system of the vehicle according to claim 15, wherein the HUD system further comprises:
an image source used for generating an image and emitting an image beam corresponding to the image;
at least one reflector configured to reflect the image beam to the transparent screen of the vehicle, wherein the user may perceive the virtual image through the transparent screen; and
a mechanically adjustable optic element disposed in a propagation path of the image beam for adjusting the imaging distance of the virtual image;
wherein the control unit is used for controlling a plurality of image parameters of the virtual image, the control unit is capable of receiving driving parameters from the vehicle, wherein the image parameters comprise at least one of a vertical field of view (FoV) of the user, a horizontal field of view (FoV) of the user, a size of the image generated by the image source, a size of the virtual image and the imaging distance of the virtual image, and at least one of the image parameters is remained the same before and after the imaging distance is changed.

17. The operation method of the HUD system of the vehicle according to claim 16, wherein the control unit controls the image source to simultaneously adjust the size of the image when the virtual image is moved from the first imaging distance to the second imaging distance, so that the FoV of the image parameters remains the same.

18. The operation method of the HUD system of the vehicle according to claim 16, wherein the control unit determines the user's eye focus distance has not changed when a value of the driving parameter related to the user's eye focus is not greater than a predetermined threshold value.

19. The operation method of the HUD system of the vehicle according to claim 16, wherein the driving parameter comprises at least one of a speed of the vehicle, a distance from another vehicle ahead of the vehicle, and a distance form an object ahead of the user.

20. The operation method of the HUD system of the vehicle according to claim 16, wherein a principle of adjusting one of the image parameters by the control unit comprises keeping the image reflected on the transparent screen occupying a same area on the transparent screen when the imaging distance is moved from the first imaging distance to the second imaging distance.

21. The operation method of the HUD system of the vehicle according to claim 20, wherein the control unit controls the image source to reduce the size of the image generated by the image source simultaneously when the control unit adjusts the imaging distance to be distant from the transparent screen, and the control unit controls the image source to enlarge the size of the image generated by the image source simultaneously when the control unit adjusts the imaging distance to be close to the transparent screen.

22. The operation method of the HUD system of the vehicle according to claim 19, wherein the control unit adjusts the imaging distance to be distant from the transparent screen when the speed of the vehicle is high, and the control unit adjusts the imaging distance to be close to the transparent screen when the speed of the vehicle is low.

23. The operation method of the HUD system of the vehicle according to claim 19, wherein the control unit controls the mechanically adjustable optic element to adjust the imaging distance to be distant from the transparent screen when the distance from another vehicle ahead of the vehicle or the distance from the object ahead of the user is further, and the control unit controls the mechanically adjustable optic element to adjust the imaging distance to be close to the transparent screen when the distance from another vehicle ahead of the vehicle or the distance from the object ahead of the user is closer.

* * * * *